United States Patent [19]
Hauk

[11] Patent Number: 5,194,074
[45] Date of Patent: Mar. 16, 1993

[54] DEVICE FOR CONTINUOUSLY PURIFYING THE WASTE GASES FROM A VACUUM UNIT

[75] Inventor: Gerhard Hauk, Bad Krozingen, Fed. Rep. of Germany

[73] Assignee: Sihi GmbH & Co. KG, Itzehoe, Fed. Rep. of Germany

[21] Appl. No.: 743,411
[22] PCT Filed: Dec. 3, 1990
[86] PCT No.: PCT/EP90/02081
    § 371 Date: Aug. 6, 1991
    § 102(e) Date: Aug. 6, 1991
[87] PCT Pub. No.: WO91/08825
    PCT Pub. Date: Jun. 27, 1991

[30] Foreign Application Priority Data
    Dec. 9, 1989 [CH] Switzerland .......... 4651/89 8

[51] Int. Cl.⁵ .............................................. B01D 53/22
[52] U.S. Cl. .......................................... 55/158; 55/189
[58] Field of Search .................... 55/16, 68, 158, 189

[56] References Cited
U.S. PATENT DOCUMENTS

| | | | |
|---|---|---|---|
| 4,675,030 | 6/1987 | Czarnecki et al. | 55/158 X |
| 4,772,295 | 9/1988 | Kato et al. | 55/16 |
| 4,931,070 | 6/1990 | Prasad | 55/158 X |
| 4,955,998 | 9/1990 | Ueda et al. | 55/16 |
| 4,994,094 | 2/1991 | Behling et al. | 55/16 |
| 5,034,025 | 7/1991 | Overmann, III | 55/68 X |
| 5,051,188 | 9/1991 | Spiske et al. | 55/16 X |

FOREIGN PATENT DOCUMENTS

| | | | |
|---|---|---|---|
| 0110858 | 6/1984 | European Pat. Off. | 55/158 |
| 0329962A2 | 8/1989 | European Pat. Off. | |
| 3824400 | 1/1990 | Fed. Rep. of Germany | 55/16 |
| 63-001419 | 1/1988 | Japan | 55/158 |
| 63-008204 | 1/1988 | Japan | 55/158 |
| 63-008205 | 1/1988 | Japan | 55/158 |
| 2-252609 | 10/1990 | Japan | 55/158 |
| 3-086210 | 4/1991 | Japan | 55/16 |

Primary Examiner—Robert Spitzer
Attorney, Agent, or Firm—Chilton, Alix & Van Kirk

[57] ABSTRACT

A device for continuously purifying the waste gases from a vacuum unit using a gas permeation membrane. Reduced equipment and operating costs are achieved with good separation performance, by using a single pump to both remove the waste gas stream from the vacuum unit and to create a pressure difference across the gas permeation membrane. The vacuum pump is disposed downstream from the vacuum unit and upstream from the gas permeation meambrane. In addition to being connected to the vacuum unit, the suction side of the vacuum pump is also connected to the permeate side of the gas permeation membrane.

14 Claims, 2 Drawing Sheets

DEVICE FOR CONTINUOUSLY PURIFYING THE WASTE GASES FROM A VACUUM UNIT

The invention relates to a device for continuously purifying the waste gases from a vacuum unit.

Many processes in which harmful gases are formed are carried out under a vacuum. To maintain the vacuum, a vacuum pump creates a steady stream of material, which also contains the harmful gases, in the direction of the atmosphere. The waste gas stream from the vacuum pump must therefore be purified. Condensation systems and absorption systems are in use for this purpose.

It is known to use gas permeation membranes for purifying gases. These are thin films whose resistance to the passage of the harmful gases to be separated out of the waste gas is smaller than that for the process gas (for example air). The gas permeation membrane is arranged in a membrane module in such a way that it separates a flow path for the waste gas from a space which is to receive the gases, termed permeate, penetrating the membrane. For carrying out the purification, it is necessary to create a pressure gradient from the waste gas side to the permeate side of the membrane module. It is known (German Offenlegungsschrift 3,806,107) to use one or more special pumps for this purpose, which are used in addition to the delivery pump of the unit.

The gas permeation technique has not been applied to vacuum units, because the expense on equipment and operation appeared to be unduly great in view of the large volumes to be dealt with in the case of vacuum. It was overlooked in this connection, however, that the use in vacuum units provides an otherwise non-existing possibility for reducing the expense on equipment and operation.

Accordingly, the solution according to the invention comprises forcing the waste gas stream by means of the vacuum pump of the vacuum unit through the membrane module and connecting the permeate side of the membrane module to the suction side of the same vacuum pump.

Expressed briefly, the vacuum pump of the vacuum unit itself is used for generating the pressure difference which is required for the operation of the gas permeation membrane module. As a result, the cost of several separate pumps is saved. Moreover, the invention has the result that, due to the recycle of the permeate into the waste gas stream, the pollutants are concentrated therein, so that the pollutant separation and/or purging can be carried out effectively. When the vacuum pump or the membrane module is mentioned here for the sake of simplicity, this is meant to include the case where several vacuum pumps or membrane modules are provided in a functional unit.

In the device according to the invention, a small part of the suction capacity of the vacuum pump is utilised for operating the gas permeation membrane module. Depending on the pollutant concentration and the nature of the membrane, this part can amount to, for example, 5-30%. As a result, recycling of the pollutants in the form of a permeate stream at high loading is achieved. They can be taken out of the gas circulation formed between the vacuum pump and the membrane module in any desired manner, in order to be destroyed or processed in another way. For example, a part of the permeate stream recycled from the membrane module to the vacuum pump can be continuously branched off. A condenser which condenses the pollutants out of the gas circulation can also be provided in the latter. Since the pollutant concentration in the permeate stream is very high, the condensation can be carried out particularly efficiently in a condenser arranged there or in the vacuum pump. Especially if a vacuum pump of low condensate tolerance is used, the pollutants are advantageously condensed out of the permeate stream on the suction side before entry into the vacuum pump and discharged. However, it can also be advantageous to provide a condenser in the waste gas stream between the vacuum pump and the membrane module, since the pollutant concentration is increased also in this region of the permeate circulation according to the invention.

If there is a possibility of pollutants being formed even on starting the vacuum unit, it can be advantageous according to the invention to generate the vacuum on the permeate side of the membrane module by means of the vacuum pump before the vacuum in the vacuum unit is generated, so that the pollutant separation already begins during the subsequent start of the waste gas stream. It can be advantageous in this connection to reduce the waste gas stream from the unit to the vacuum pump by means of a restriction valve, in order to ensure the pressure difference, required for operation of the membrane module, in the purification circulation.

If it is to be expected that considerable pressure fluctuations will occur in the vacuum unit, greater constancy of the pressure difference acting on the membrane module can be achieved by installing a buffer volume between the permeate side of the membrane module and the vacuum pump. This can also be advantageous for the start phase of the vacuum process.

The type of membrane module is not critical for the invention. For example, capillary modules, wound modules or pad modules can be used. Polydimethylsiloxane and silicone have proved to be suitable membrane materials; however, other membrane materials can also be used. Advantageously, the membrane module is at the same time designed as a flame trap.

The device according to the invention is in principle independent of the type of vacuum pump.

It is a condition for the magnitude of the vacuum on the unit side that it must be sufficient for the purification operation according to the invention. It should be below 300 mbar. A permeate-side vacuum between 20 and 300 mbar, preferably between 50 and 200 mbar, is particularly advantageous. The highest specific purification efficiency is achieved in this low vacuum range, because the purification effect rises less steeply at lower permeate-side pressures than the power requirement.

The term pollutants used for the sake of simplicity includes non-harmful materials which are to be separated off.

The invention will be explained in more detail below by reference to the drawing which illustrates three advantageous illustrative examples in a diagrammatic representation.

BRIEF DESCRIPTION OF THE DRAWINGS

FIG. 1 shows the process diagram for the case that a liquid ring pump operated with closed ring liquid circulation is used. These pumps are distinguished by an almost unlimited tolerance with respect to the condensate contained in the delivery stream. The condensate can be used as the operating liquid which forms the liquid ring of the pump.

Figure 1:
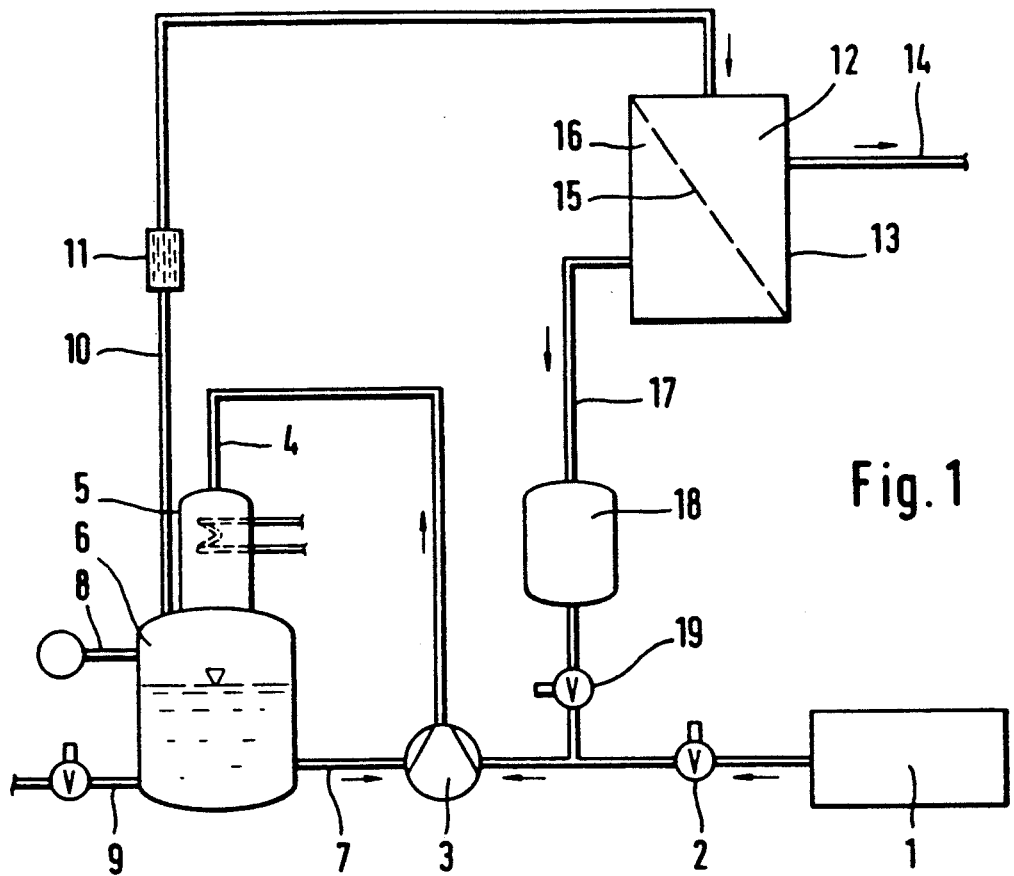
FIG. 1 illustrates an apparatus for continuously purifying waste gases from a vacuum unit according to a preferred embodiment of the invention.

Gas is extracted from a vacuum process vessel 1 via a control valve 2 by the vacuum pump 3. The waste gas stream from the vacuum pump is passed via line 4 to a cooler in which the condensable materials are removed from the waste gas stream. They then pass into an operating liquid stock vessel 6, from which they are, if appropriate, recycled via line 7 as or with the operating liquid to the liquid ring pump 3. The cooling can also be carried out separately in one gas cooler and one liquid cooler. Depending on the level, controlled by the probe 8, in the operating liquid vessel 6, the excess liquid is taken off via line 9.

Downstream of the cooler 5, the waste gas stream which is still laden with pollutants passes via line 10 and demister 11 through the waste gas part 12 of the membrane module 13 and is discharged as purified gas via line 14. The membrane 15 separates the waste gas space 12 from the permeate space 16. While the pressure in the waste gas space 12 does not substantially differ from atmospheric pressure, the pressure in the permeate space 16 is determined by the vacuum on the suction side of the vacuum pump 3. Under the action of this pressure difference, the pollutants diffuse through the membrane 15 and are taken away as permeate through the line 17 and the buffer tank 18 as well as a control valve 19 to the suction side of the pump 3. The control valve permits a higher pressure than that in the unit 1 to be set on the permeate side, if the unit-side vacuum should be too low for effective and low-power purification operation.

Since the permeate from line 17 is added to the waste gas stream, the pollutants are concentrated towards the condenser 5, so that they can efficiently be precipitated therein.

Figure 2:
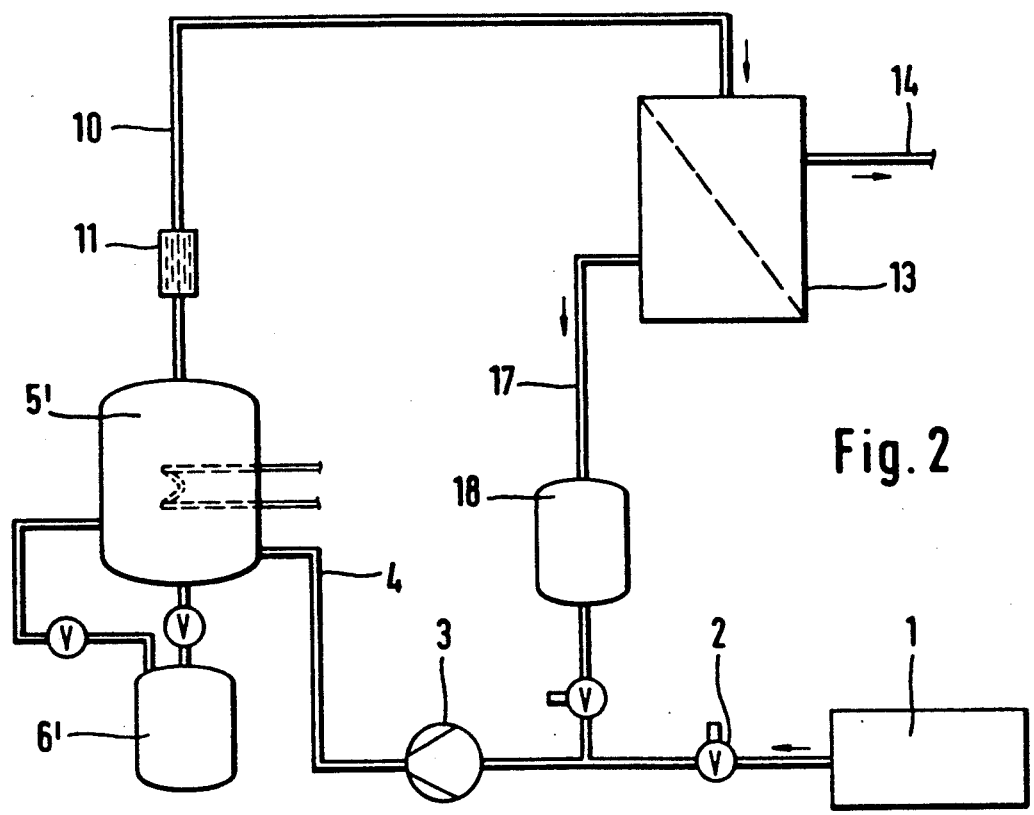
FIG. 2 shows a second embodiment of an apparatus for continuously purifying waste gas from a vacuum unit according to the invention.

The illustrative example of FIG. 2 resembles that of FIG. 1, with the exception of the circumstance that the condensate arising in the condenser 5' and the condensate vessel 6' is not recycled as operating liquid to the pump 3. This is the case when a pump is used in which no condensation takes place and/or an operating liquid which must be kept separate from the condensate, for example oil as lubricant, is utilised or if no operating liquid is used. These include, for example, rotary-vane pumps and Roots pumps which are lubricated by circulation or fresh oil or run dry.

Figure 3:
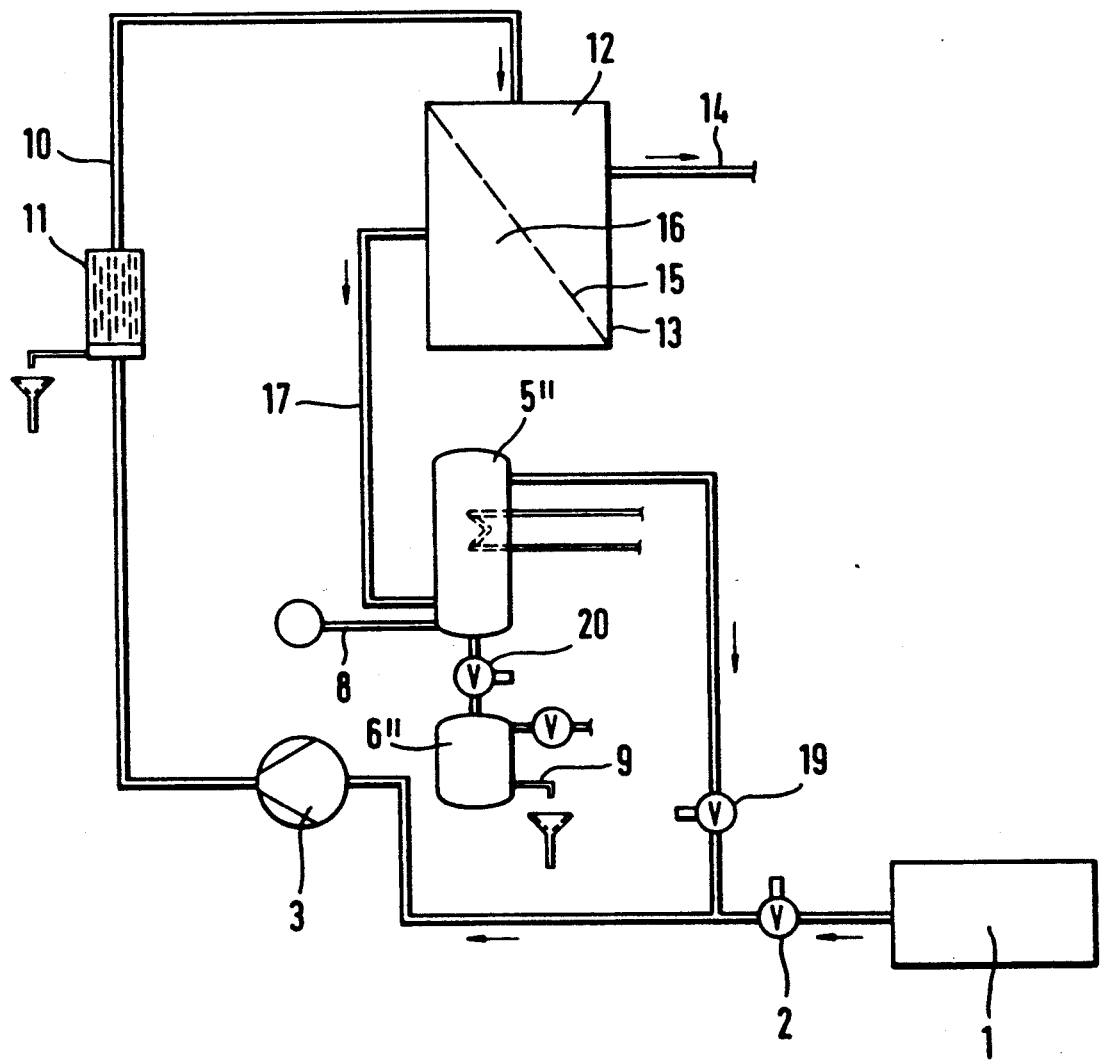
FIG. 3 shows a third embodiment of an apparatus for continuously purifying waste gas from a vacuum unit according to the invention.

Whereas, in the examples explained above, the condenser is located in the waste gas stream between the pump and membrane module, it is provided in the illustrative example of FIG. 3 in the permeate stream between the membrane module and the pump suction side. Since a major part of the pollutant content of the permeate stream highly enriched in pollutants condenses in the low-temperature condenser 5" and therefore does not pass into the vacuum pump 3, this type of construction is suitable for vacuum pumps of low condensate tolerance. The condensate is discharged from the condenser 5" via a pressure lock 20 into a condensate vessel 6".

Particularly efficient condensation is possible in the condenser 5" in spite of the vacuum prevailing therein because, on the one hand, there is high pollutant loading and, on the other hand, a very low condensation temperature can be set because of the low water vapour content. The low water vapour content in the permeate stream is accomplished by the low water vapour permeability of the membrane.

This unit variant is used particularly in those types of vacuum pump in which a condensate would interfere with the compression step. This is relevant particularly with vacuum pumps of the membrane type, reciprocating piston type and some rotary-vane types. In principle, however, the design according to FIG. 3 can be used for all types of vacuum pumps and also for pumps with gas ballast control.

EXAMPLE

A device of the design according to FIG. 1 was operated with a liquid ring pump having a nominal suction capacity of 32 m$^3$/hour. Mainly isopropyl acetate was extracted from the vacuum distillation process and this also served as the operating liquid (ring liquid) in the pump. A capillary membrane module having an effective separation area of 1 m$^2$ was used. It was possible to achieve excellent waste gas purification. The following table shows the most important degrees of separation achieved, and the inlet and outlet concentrations Ci and Co as a function of the operating vacuum Pv (permeate side) and of the effective waste gas flow Vq. The separation performance was obtained, without impairing the unit vacuum, with the existing vacuum pump and the existing condenser.

| Waste gas flow Vq (m$^3$/h) | Inlet concentration Ci (g/m$^2$) | Outlet concentration Co (g/m$^2$) | Operating vacuum Pv (mbar) | Degree of separation (%) |
|---|---|---|---|---|
| 2.02 | 18.30 | 11.97 | 740 | 34.6 |
| 2.48 | 18.30 | 7.04 | 540 | 61.5 |
| 2.60 | 18.30 | 5.28 | 370 | 71.1 |
| 2.72 | 19.36 | 2.11 | 100 | 89.1 |
| 3.81 | 18.30 | 3.52 | 250 | 80.8 |
| 2.02 | 18.30 | 11.09 | 730 | 39.4 |

I claim:

1. An apparatus for continuously purifying waste gas emitted from a vacuum unit, comprising:
   a gas permeation membrane module for separating the waste gas into a permeate gas and a non-permeate gas, the membrane module including an inlet side having a waste gas inlet and a non-permeate gas outlet, and a permeate side having a permeate gas outlet,
   vacuum pump means for removing the waste gas from the vacuum unit, delivering the waste gas to the membrane module, and separating the waste gas in the gas permeation membrane module, the vacuum pump means consisting of a single vacuum pump, the vacuum pump having a compression side fluidly connected to the inlet side of the membrane module, and a suction side fluidly connected to the permeate side of the membrane module and fluidly connectable to a subatmospheric outlet of the vacuum unit, and
   permeate outlet means disposed between the gas permeation membrane module and the vacuum pump.

2. An apparatus according to claim 1, wherein the vacuum on the permeate side of the membrane module is generated by means of the vacuum pump before the vacuum in the vacuum unit is generated.

3. An apparatus according to claim 1, wherein the vacuum pump can generate a vacuum on the permeate side of the membrane module whether or not waste gas is concurrently being removed from the vacuum unit.

4. An apparatus according to claim 1, wherein the permeate outlet means comprises condenser means for at least partially condensing the permeate gas, removing the condensate from the apparatus, and recirculating the uncondensed permeate gas.

5. An apparatus according to claim 4, wherein the condenser means is at least partially located in the vacuum pump.

6. An apparatus according to claim 4, wherein the condenser means is disposed upstream from the vacuum pump.

7. An apparatus according to claim 4, wherein the condenser means is disposed downstream from the vacuum pump.

8. An apparatus according to claim 7, wherein the condenser means includes a liquid recycle stream which feeds into the vacuum pump.

9. An apparatus according to claim 4, wherein the condenser means is fluidly connected to a condensate vessel which collects the condensate.

10. An apparatus according to claim 1, wherein the membrane module further comprises a flame trap.

11. An apparatus according to claim 1, further comprising a vacuum buffer tank disposed downstream from the membrane module and upstream from the vacuum pump.

12. An apparatus according to claim 1, wherein the pressure on the permeate side of the membrane module is between about 20 and 300 mbar.

13. An apparatus according to claim 1, wherein the pressure on the permeate side of the membrane module is between about 50 and 200 mbar.

14. An apparatus according to claim 13, wherein the pressure on the inlet side of the membrane module is atmospheric pressure.

* * * * *